US012632184B2

(12) United States Patent
Zhu et al.

(10) Patent No.: US 12,632,184 B2
(45) Date of Patent: May 19, 2026

(54) PREDICTING LIFESPAN OF FLASH MEMORY BASED ON ACTUAL USAGE PROFILE

(71) Applicant: Continental Automotive Systems, Inc., Auburn Hills, MI (US)

(72) Inventors: Yu Zhu, Vernon Hills, IL (US); Edward A. Naddeo, Barrington, IL (US); Wei Zhang, Vernon Hills, IL (US)

(73) Assignee: AUMOVIO Systems, Inc., Auburn Hills, MI (US)

( * ) Notice: Subject to any disclaimer, the term of this patent is extended or adjusted under 35 U.S.C. 154(b) by 0 days.

(21) Appl. No.: 17/559,753

(22) Filed: Dec. 22, 2021

(65) Prior Publication Data

US 2022/0276790 A1 Sep. 1, 2022

Related U.S. Application Data

(60) Provisional application No. 63/129,335, filed on Dec. 22, 2020.

(51) Int. Cl.
*G06F 3/06* (2006.01)

(52) U.S. Cl.
CPC .......... *G06F 3/0616* (2013.01); *G06F 3/0619* (2013.01); *G06F 3/0643* (2013.01); *G06F 3/0659* (2013.01); *G06F 3/0679* (2013.01)

(58) Field of Classification Search
CPC .... G06F 3/0616; G06F 3/0619; G06F 3/0643; G06F 3/0659; G06F 3/0679
See application file for complete search history.

(56) References Cited

U.S. PATENT DOCUMENTS 7,975,193 B2    7/2011   Johnson
8,010,738 B1    8/2011   Chilton et al.
          (Continued)

OTHER PUBLICATIONS

Jim Cooke "Flash Memory 101: An Introduction to NAND " EE Times, Mar. 20, 2006.
          (Continued)

*Primary Examiner* — Eric T Loonan

(57) ABSTRACT

The lifespan of flash memory is predicted based on the actual usage profile. Typical use cases are defined. The number of flash memory block writes for each of the typical use cases is collected. Regions of flash memory are defined, wherein each region includes continuous blocks of flash memory and serve a dedicated function in the file system, each functional region are accessed at different frequency, thus region is the smallest and lowest unit where end of life failure of flash part manifests at file system level. During development testing, data is collected to determine a rate at which writes are occurring in each of the regions for each use case and the data is stored in a number-of-writes-per-region-per-use-case table. During use of the electronic device by an end user, occurrences of each of the typical use cases are periodically tracked. An average number of periodical page writes for each of the defined regions of flash memory is calculated. An estimated life span for each region of flash memory is calculated. A flash-file-system-failure date is estimated based on the estimated life span for each region of flash memory. An alert is provided when the flash-file-system-failure date is within a predetermined number of days.

15 Claims, 7 Drawing Sheets

(56)                    References Cited

U.S. PATENT DOCUMENTS

| | | | |
|---|---|---|---|
| 8,108,179 | B2 | 1/2012 | Astigarraga et al. |
| 10,180,797 | B2 | 1/2019 | Grimsrud |
| 10,222,982 | B2 | 3/2019 | Nangoh |
| 10,222,984 | B1 * | 3/2019 | O'Brien, III .......... G06F 3/0644 |
| 11,698,746 | B1 * | 7/2023 | Geukens ............... G06F 3/0653 |
| | | | 711/156 |
| 2005/0044454 | A1 | 2/2005 | Moshayedi |
| 2007/0266200 | A1 | 11/2007 | Gorobets et al. |
| 2008/0005508 | A1 * | 1/2008 | Asano ................... G06F 3/0649 |
| | | | 711/161 |
| 2010/0122148 | A1 | 5/2010 | Flynn et al. |
| 2014/0006898 | A1 * | 1/2014 | Sharon ................ G06F 12/0246 |
| | | | 714/755 |
| 2017/0228161 | A1 * | 8/2017 | Nangoh ................ G06F 3/0604 |

OTHER PUBLICATIONS

Robert Sheldon "NAND flash memory basics; Comparing SLC, MLC and TLC NAND", The ultimate guide to NAND flash technology, TechTarget, Nov. 20, 2017.
"NAND flash 101: An Introduction to NAND Flash and How to Design It to Your Next Production", TN-29-19: NAND flash 101 Introduction, Micron Technology, Inc., Revision B, Apr. 2010.

* cited by examiner

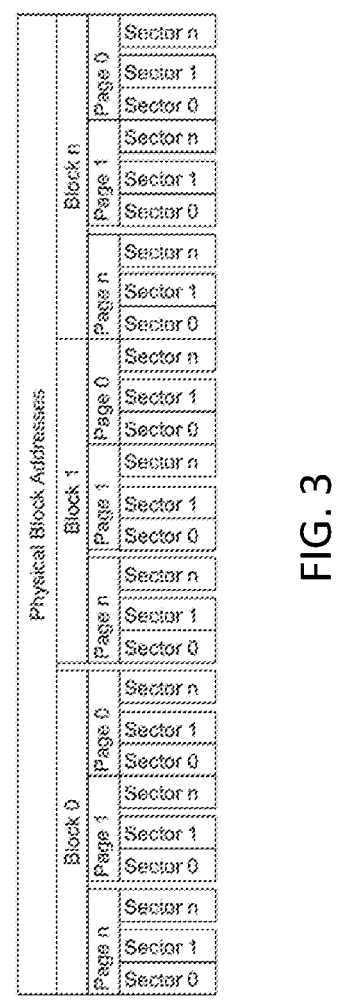

Physical Block Addresses

| Block 0 | | | | | | | Block 1 | | | | | | | Block n | | |
|---|---|---|---|---|---|---|---|---|---|---|---|---|---|---|---|---|
| Page n | | | Page 1 | | | Page 0 | Page n | | | Page 1 | | | Page 0 | Page 1 | | Page 0 |
| Sector n | Sector 1 | Sector 0 | Sector n | Sector 1 | Sector 0 | Sector n Sector 1 Sector 0 | Sector n | Sector 1 | Sector 0 | Sector n | Sector 1 | Sector 0 | Sector n Sector 1 Sector 0 | Sector n Sector 1 Sector 0 | Sector n Sector 1 Sector 0 | Sector n Sector 1 Sector 0 |

FIG. 3

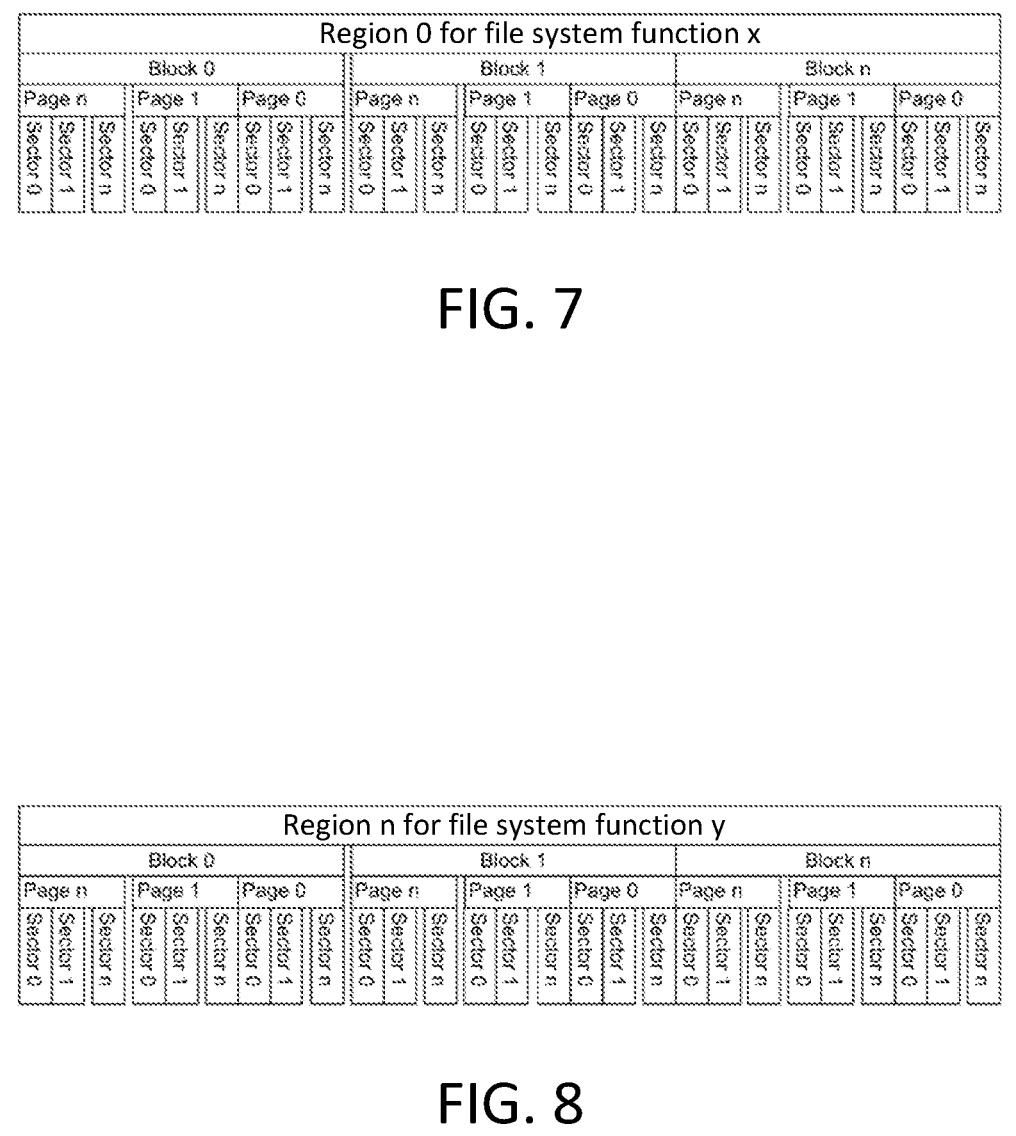

| Region 0 for file system function x | | | | | | | | |
|---|---|---|---|---|---|---|---|---|
| Block 0 | | | Block 1 | | | Block n | | |
| Page n | Page 1 | Page 0 | Page n | Page 1 | Page 0 | Page n | Page 1 | Page 0 |
| Sector 0 / Sector 1 / Sector n | Sector 0 / Sector 1 / Sector n | Sector 0 / Sector 1 / Sector n | Sector 0 / Sector 1 / Sector n | Sector 0 / Sector 1 / Sector n | Sector 0 / Sector 1 / Sector n | Sector 0 / Sector 1 / Sector n | Sector 0 / Sector 1 / Sector n | Sector 0 / Sector 1 / Sector n |

FIG. 7

| Region n for file system function y | | | | | | | | |
|---|---|---|---|---|---|---|---|---|
| Block 0 | | | Block 1 | | | Block n | | |
| Page n | Page 1 | Page 0 | Page n | Page 1 | Page 0 | Page n | Page 1 | Page 0 |
| Sector 0 / Sector 1 / Sector n | Sector 0 / Sector 1 / Sector n | Sector 0 / Sector 1 / Sector n | Sector 0 / Sector 1 / Sector n | Sector 0 / Sector 1 / Sector n | Sector 0 / Sector 1 / Sector n | Sector 0 / Sector 1 / Sector n | Sector 0 / Sector 1 / Sector n | Sector 0 / Sector 1 / Sector n |

FIG. 8

PREDICTING LIFESPAN OF FLASH MEMORY BASED ON ACTUAL USAGE PROFILE

BACKGROUND

Flash memory is an electronic non-volatile computer memory storage medium that can be electrically erased and reprogrammed. The two main types of flash memory, NOR flash and NAND flash, are named after the NOR and NAND logic gates. The individual flash memory cells, consisting of floating-gate MOSFETs, exhibit internal characteristics similar to those of the corresponding gates. A flash memory device typically consists of one or more flash memory chips (each holding many flash memory cells) along with an optional separate flash memory controller chip.

The NAND type is found primarily in memory cards, USB flash drives, solid-state drives (those produced in 2009 or later), feature phones, smartphones and similar products, for general storage and transfer of data. NAND or NOR flash memory is also often used to store configuration data in numerous digital products, a task previously made possible by EEPROM or battery-powered static RAM. One key disadvantage of flash memory is that it can only endure a relatively small number of write cycles in a specific block compared to RAM.

Example applications of flash memory include computers, PDAs, digital audio players, digital cameras, mobile phones, synthesizers, video games, scientific instrumentation, industrial robotics, automobiles, and medical electronics. Flash memory's mechanical shock resistance has facilitated its popularity over hard disks in portable devices.

Embodiments of the invention are directed to predicting the lifespan of an electronic device that relies on flash memory by monitoring the file system write operations performed by the electronic device.

An example of such an electronic device is a NAD (Network Access Device)/TCU (Telematic Control Unit). Continental Automotive manufactures and ships millions of SoC based NAD/TCUs to automotive manufacturers worldwide. The units use cellular networks worldwide and information from GNSS systems to provide mission critical emergency calls and other Telematics services. NAND flash memory is the underlying storage for the filesystem (FS) of NAD/TCU software that stores mission critical data that is essential to these Telematics services.

If this mission critical data become corrupted, the TCU will stop functioning, such that emergency-call functionality would be unavailable when it is needed during an emergency, and the vehicle operators would need to bring the vehicles to a dealership for troubleshooting and repair. At a minimum, the repair will involve software re-flashing and often the TCU will be replaced. This repair process is costly to automotive OEMs and their tier 1 suppliers.

Because each block of flash write cycles are limited (for example 100,000 PROGRAM/ERASE cycles for a particular memory supplier's SLC NAND memory devices), Program/Erase endurance is defined as the specified max number of program/erase cycles a block of flash can endure before data retention becomes too low. When the number of bad blocks is beyond the maximum number allowed for the system, the file system becomes corrupted, corresponding system software will fail to run, and the TCU will stop functioning. So, there is a direct relationship between number of flash writes and lifespan of the telematics unit before becoming a field return. Since usage pattern of file system depends on TCU operational environment (e.g. system initialize configuration, cellular system switch and GNSS information changes) these flash write numbers can be very individualistic and provide a unique impact to the device life span, such that without knowing usage history and lifespan of flash memory part, cannot be accurately predicted. (For example, end customers (vehicle drivers) use their vehicles and, therefore, the telematics units, differently. One uses the vehicle regularly, 1-2 hours driving between home and office during weekdays, 2-3 hours driving during weekend, average 5-10 times crank the vehicle every day, less than 250 miles every week. Another uses the vehicle as a business tool, 4-5 hours driving during weekdays and 2-3 hours driving during weekend, average 20 plus times crank the vehicle every day, over 500 miles driving every week). When ultimately the TCU fails due to excessive flash writes and is returned to an automotive OEM and subsequently to Continental, it is difficult to identify the exact root cause and explain to the customer why the unit has failed. First, there could be multiple causes for the failure, e.g. file system software defects, uncontrolled power down or excessive writes. Even if the failure is caused by excessive writes, without knowing the pertinent customer usage profile and corresponding flash block writes, it's not possible to reach a conclusion to satisfy the customer. For example, if a unit is continuously power cycled every few minutes, since there are more frequent flash writes at power up and power down, it will be quicker for the flash part to reach the max P/E endurance threshold. Even this might not be a typical scenario, it can't be simply ruled out either during field return analysis.

Because of this wide variance of number of flash writes from car to car, it is an open question if the file system design of a TCU can meet the 10 to 15 years requirement, that most cars are used.

In the prior art, algorithms are executed on built in memory controllers. They focus on physical characteristics of the flash device and assume a linear rate of usage to predict end of life of product. But predicting life of product based on actual user usage and non-linear behavior would be an improvement because it more accurately predicts end of life of the product by taking into account spikes in usage.

As such, determining the lifespan of a flash memory part based on the individualized customer usage profile would be an improvement, which is also applicable to any computer-based systems that use flash memory parts.

BRIEF SUMMARY

Embodiments of the invention are directed to predicting the lifespan of flash memory based on the actual usage profile. Typical use cases are defined. The number of flash memory block writes for each of the typical use cases is collected. Regions of flash memory are defined, wherein each region includes continuous blocks of flash memory. During development testing, data is collected to determine a rate at which writes are occurring in each of the regions for each use case and the data is stored in a number-of-writes-per-region-per-use-case table. During use of the electronic device by an end user, occurrences of each of the typical use cases are periodically tracked. An average number of daily page writes for each of the defined regions of flash memory is calculated. An estimated life span for each region of flash memory is calculated. A flash-file-system-failure date is estimated based on the estimated life span for each region of flash memory. An alert is provided when the flash-file-system-failure date is within a predetermined number of days.

BRIEF DESCRIPTION OF THE DRAWINGS

FIG. 3 depicts how flash memory is organized into blocks, pages, and sectors.

FIG. 7 is similar to FIG. 3, except that FIG. 7 depicts how flash memory is organized into blocks, pages, and sectors for a Region 0 for a file system function X.

FIG. 8 is similar to FIG. 7, except that FIG. 8 depicts how flash memory is organized into blocks, pages, and sectors for a Region N for a file system function Y.

DETAILED DESCRIPTION

Aspects of the invention are discussed in the context of an automotive telematics control unit having flash memory. But embodiments of the invention are applicable to any computer-based systems that use flash memory parts.

Figure 1:
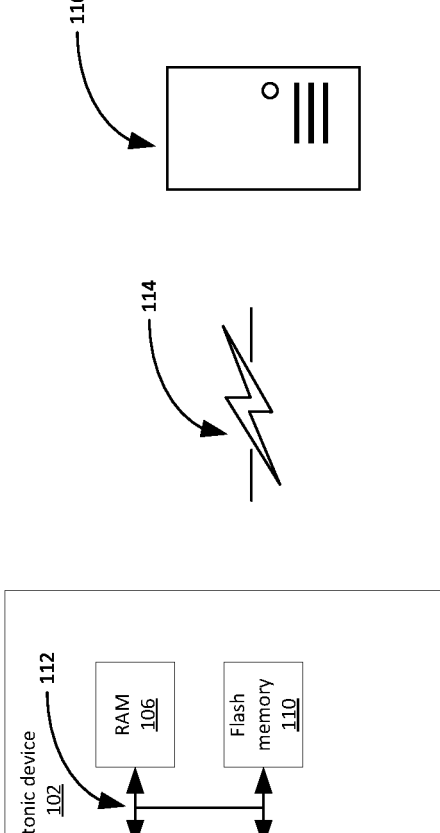
FIG. 1 depicts an apparatus for which a lifespan of flash memory may be predicted based on an actual usage profile in accordance with embodiments of the invention.

FIG. 1 depicts an apparatus for which a lifespan of flash memory may be predicted based on an actual usage profile in accordance with embodiments of the invention. An electronic device 102 includes a processor, Random Access Memory (RAM) 106, an optional display 108, and flash memory 110, which can communicate with each other via a data bus 112. The electronic device may also communicate via a wireless connection 114 or a wired connection (not shown) with a remotely located computer 116. The remotely located computer may store data received from the electronic device, perform data operations on the data received and may provide one or more alert messages to a user in any manner, many of which are well known in the art, such as by e-mail, text, audio, video, and the like.

Figure 2:
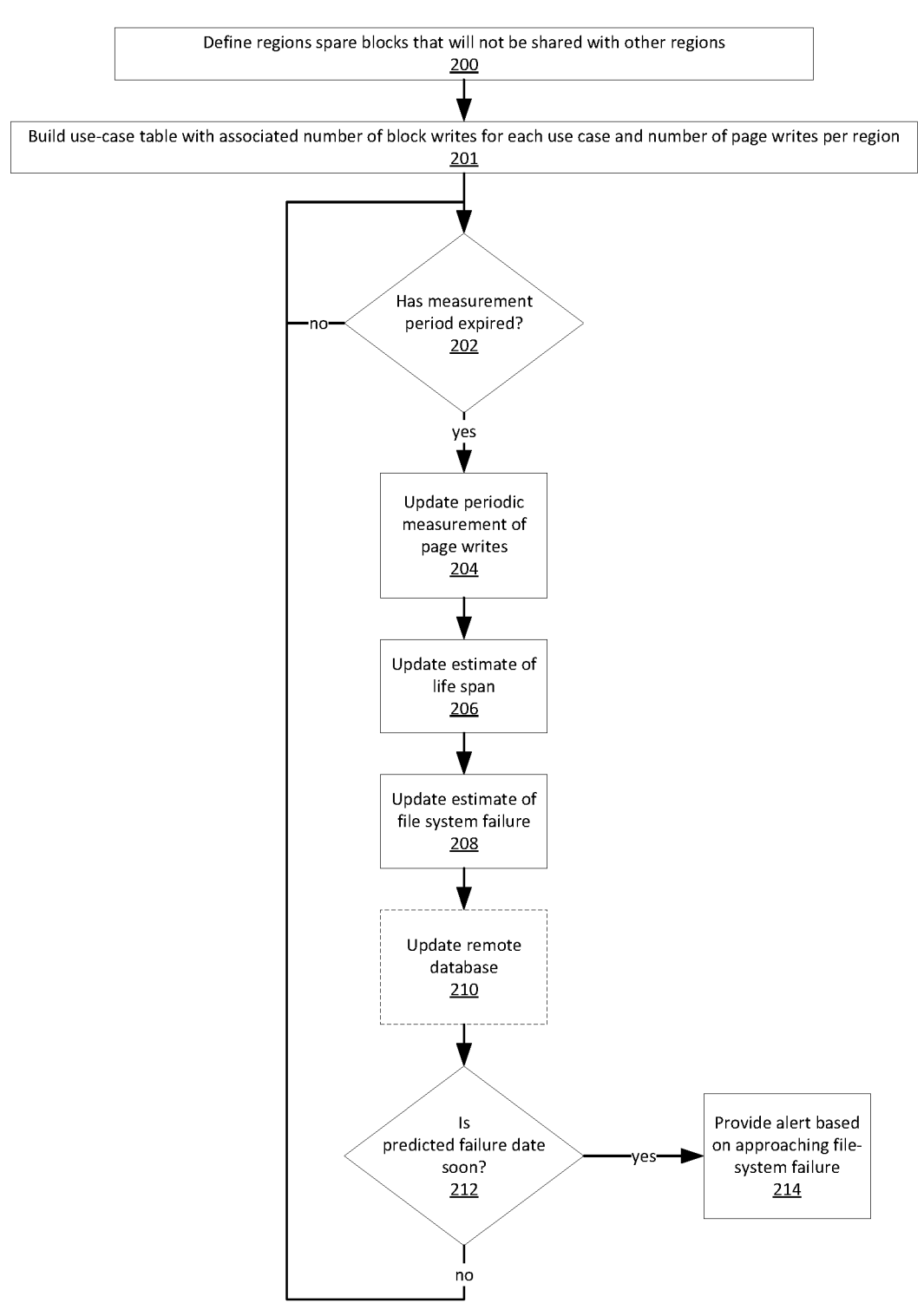
FIG. 2 depicts a process for predicting the lifespan of flash memory based on an actual usage profile in accordance with embodiments of the invention.

FIG. 2 depicts a process for predicting the lifespan of flash memory based on an actual usage profile in accordance with embodiments of the invention. At 200, typical use cases are defined and an associated number of flash page writes for each the following use cases is collected:

Power on boot
Power off shutdown
Ignition on (cranking)
Ignition off
Ignition on and car idling for 1 hour
Ignition off and car parked for 1 hour
Driving the vehicle for 1 hour (typical cellular communication condition)
Flash scrub
Personal call
Emergency call
Roadside assistant call Internet based data call
RAT (Radio access technology, e.g 2G, 3G, 4G, 5G etc) change
Any other typical use case FIG. 3 depicts how flash memory is organized into blocks, pages, and sectors. The smallest logical unit is a sector. Each sector contains a storage area (e.g., 512 or 2,048 bytes) plus a small overhead area (16 bytes). Sectors are grouped into pages, and blocks include multiple pages (e.g., 32 pages of 512 bytes, 64 pages of 2,048 bytes, or the like). Blocks contain a defined number of sectors, and there may be 1,000 to 8,000 blocks per chip.

Referring again to FIG. 2, regions, which we classify as logical continuous blocks of flash that are defined with having its own spare blocks that will not be shared with other regions and serve a dedicated function in the file system, each functional region are accessed at different frequency, thus region is the smallest and lowest unit where end of life failure of flash part manifests at file system level (as shown at 200), in other words when a region fails, integrity of the complete file system is compromised.

At 201, a table is built as follows using data collected during development testing to determine the rate at which writes are occurring for each use case (e.g., writes/hour)

| i | Use case | Number of page writes in region A | Number of page writes in region B | Number of page writes in region C | Number of page writes in region . . . |
|---|---|---|---|---|---|
| 1 | Power on boot | | | | |
| 2 | Power off shutdown | | | | |
| 3 | Ignition on (cranking) | | | | |
| 4 | Ignition off | | | | |
| 5 | Car in idle for 1 hour | | | | |
| 6 | Car in parking for 1 hour | | | | |
| 7 | Drive for 1 hour | | | | |
| . . . | Flash scrub | | | | |
| n | Any other typical use case (such as emergency calls, roadside assistant call, personal calls, RAT changes and others) | | | | |

As shown at 202 and 204, once the electronic device is being used by an end user, the following use-case items are tracked in electronic device (e.g., telematics) application software on a periodical basis (e.g., every 24 hours):

Number of power on boots
Number of power off shutdowns
Number of ignition ons
Number of ignition offs
Hours that car in idle
Hours that car in parking
Hours that car being driven
Number of Flash scrubs
Number of personal calls
Number of emergency calls
Number of roadside assistant calls
Number of Internet based data calls
Number of RAT changes
.
.
.

An average number of page writes per period is calculated as follows:

For each region, calculate:

$$WritesperPeriod = \sum_i T_i * R_i$$

Where: i is the use case; $T_i$ is the duration of use case within measurement period; and RI is the rate of writes for each use case from the table of use cases.

A Simple Example

During development, it was determined that Ignition on writes 100 times per hour to Region A and 50 times per hour to Region B. Ignition off is 300 and 100 per hour for Region A and B and Driving does 30 and 60 for each respective region as well.

It is monitored that ignition on and ignition off happened twice a day each for $\frac{1}{60}$ hour each time. Driving was 5 hours for the measurement period. To calculate the writes for that day, Region A: $\frac{2}{60}*100+\frac{2}{60}*300+5*30$　　　　　　　i.

Region B: $\frac{2}{60}*50+\frac{2}{60}*100+5*60$　　　　　　　ii.

Refer to Flow Diagram

Multiple methods may be used to determine a weighted or moving average for the writes to predict future usage. For example, a time period of 10 days may be used, a total number of page writes from the past 10 days may be added up, and then the result may be divided by 10. Artificial Intelligence may be used to determine any patterns in usage over prolonged periods of time, (e.g. weekly, seasonally, annually) as the driver's usage changes. As automobiles are able to develop resources to determine user, it can also start predicting patterns based on how often a particular user drives the car.

As shown at 206, an estimated life for each region is calculated.

> (Program/Erase endurance, $x$ pages per block×[number of blocks in region−bad blocks in region]−accumulated total page writes in the region)/moving (or weighted) average of total number of page writes per day=estimate life span left in days (/365)=estimate life span left in years.

P/E endurance is defined as the specified max number of program/erase cycles a block of flash can endure before data retention becomes too low.

Knowing the out of factory date of the TCU, the estimate date for flash file system failure can be predicted, as shown at 208. As depicted at 210, such an estimate may be sent to a remote computer 116 and/or a database at a Telematics service center, for example, periodically.

Precaution steps may be taken before a predicted failure occurs, as shown by the yes branch from 212 and 214. For example, an automotive OEM could alert a customer to bring a vehicle in for service once the predicted failure date is relatively soon, such as 1 week, 1 month, 2 months, or 3 months, for example. Checking the estimated date of failure could be added to regularly scheduled maintenance that is scheduled to occur at intervals defined by a number of miles driven and/or an amount of time that has passed since the vehicle has last been serviced.

In the context of an automotive TCU, embodiments of the invention may give a tier 1 supplier a warning before a unit fails due to flash corruption, such that the supplier may then be able to understand how the individual usage profile affects the lifespan of the unit due to flash corruption. Further a tier 1 supplier and an auto Original Equipment Manufacturer may estimate the number of field returns due to flash corruption and plan accordingly ahead of time. As will be apparent, such advantages will apply to other types of electronic devices with flash memory.

A further improvement would be to predict end of life more accurately while not incurring any flash writes in the process, as opposed to prior art techniques, which make use of frequently updated counters stored on flash. Usage profiles could be stored in RAM and then be averaging out for a period time and updated to a server, or can be stored locally in flash once a day or longer period of time instead of every time an erase is made in flash, which is done far more frequently on a daily usage. A typical use case in the Telematics application of automobile is during the day when car is driven key usage information (e.g. number of Ignition on, number of Ignition off, drive history etc.) is collected and stored in the RAM of Telematics control unit. When the car is parked in the night, Telematics control unit connects to the Telematics control center and uploads its usage information of the day to the server and all the calculations defined in FIG. 2 can be done on the server. Because server knows flash access counts for each use case, server can calculate and update total flash access counts on the server. During this whole process, no flash writes to TCU occur.

Figure 4:
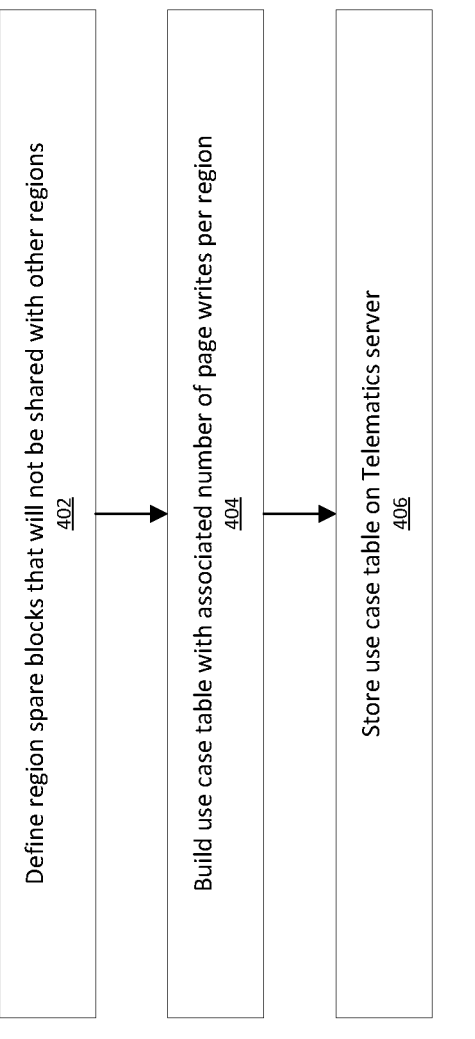
FIG. 4 depicts steps of a method performed during a development stage in accordance with embodiments of the invention.

FIG. 4 depicts steps of a method performed during a development stage in accordance with embodiments of the invention. At step 402, region spare blocks that will not be shared with other regions are defined. A use case table with associated number of page writes per regions is built at 404. And the use case table is stored on a telematics server at 406.

Figure 5:
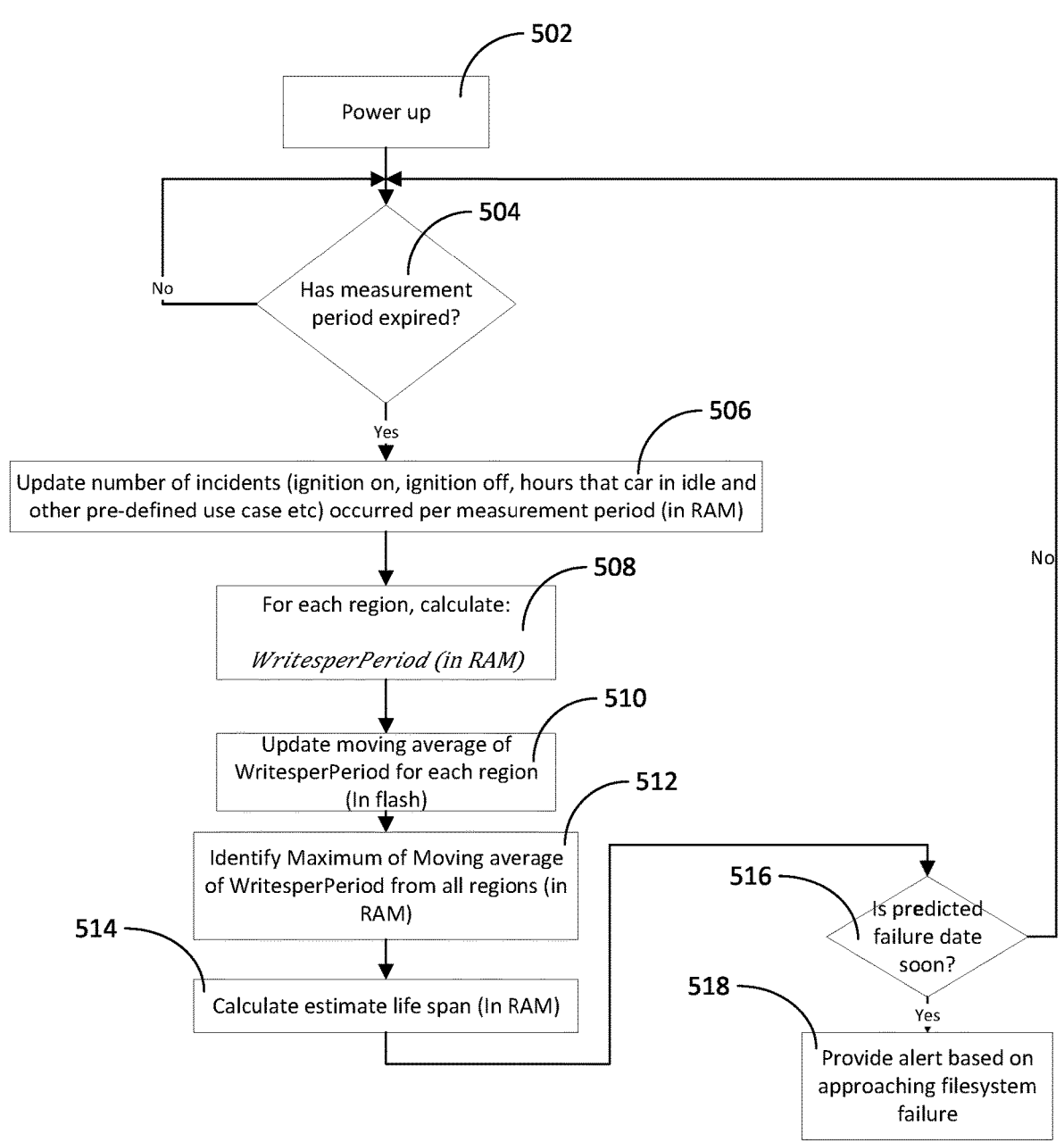
FIG. 5 depicts steps performed by a device in the field in accordance with embodiments of the invention.

FIG. 5 depicts steps performed by a device in the field in accordance with embodiments of the invention. The device is powered up at 502. A determination is made at 504 with respect to whether a measurement period has expired. A number of incidents (ignition on, ignition off, hours that car in idle and other pre-defined use case etc) occurred per measurement period is updated (in RAM) at 506. For each region, WritesperPeriod is calculated and stored in RAM at 508. A moving average of WritesperPeriod for each region is updated in flash at 510. A Maximum of Moving average of WritesperPeriod from all regions is identified and stored in RAM at 512. An estimate of the device's life span is calculated and stored in RAM at 514. A determination is made at 516 with respect to whether the calculated estimate of the device's life span predicts a failure date that is soon (e.g., 6 months, 4 months, 3 months, 2 months, 1 month, 2 weeks, or any other suitable period of time). At 518, an alert is provided based on a determination that the calculated estimate of the device's life span predicts a failure date that is soon.

Figure 6:
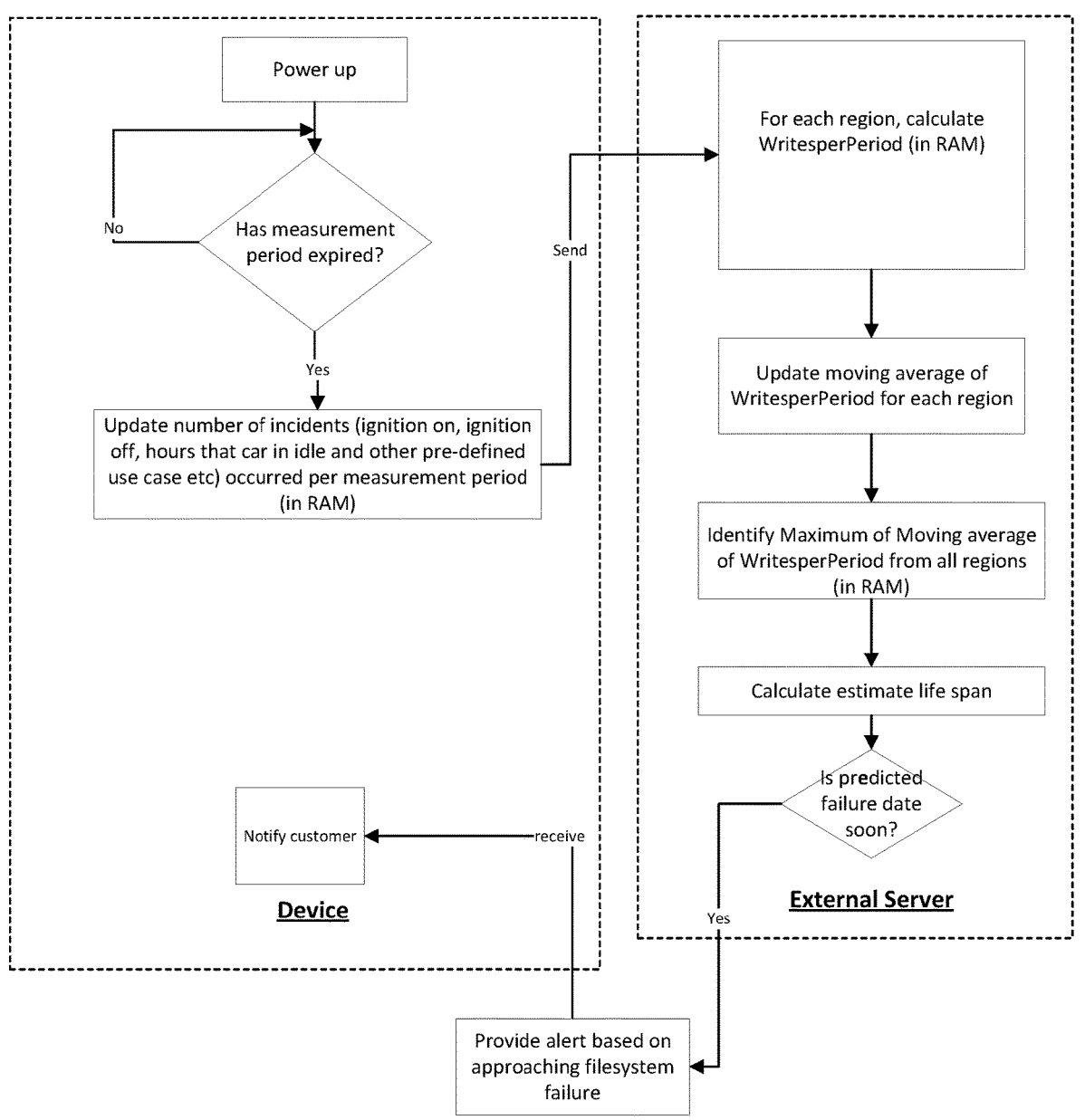
FIG. 6 depicts an embodiment similar to the embodiment depicted in FIG. 5, except that the various calculations, updates, and identifications are performed by an external, instead of by the device itself.

FIG. 6 depicts an embodiment similar to the embodiment depicted in FIG. 5, except that the various calculations, updates, and identifications are performed by an external, instead of by the device itself.

FIG. 7 is similar to FIG. 3, except that FIG. 7 depicts how flash memory is organized into blocks, pages, and sectors for a Region 0 for a file system function X.

FIG. 8 is similar to FIG. 7, except that FIG. 8 depicts how flash memory is organized into blocks, pages, and sectors for a Region N for a file system function Y.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. A method comprising:

defining a plurality of typical use cases for an electronic device, wherein the electronic device is an automotive telematics control unit of an automotive vehicle;

by the automotive telematics control unit and during development testing, performing flash memory block writes for each of the typical use cases and then collecting a corresponding number of the flash memory block writes for each of the typical use cases;

defining a plurality of regions of flash memory, wherein each region includes a plurality of continuous blocks of the flash memory;

during the development testing, collecting data to determine a rate at which the writes are occurring by an automotive telematics control unit in each of the regions for each use case and storing the collected data in a number-of-writes-per-region-per-use-case table on an external server;

subsequently operating the telematics control unit by an end user to perform the typical use cases;

while operating the telematics control unit by the end user, performing periodical page writes for each of the defined regions in the flash memory and periodically tracking occurrences of each of the typical use cases;

calculating, by the external server, an average number of periodical page writes by the automotive telematics control unit of the automotive vehicle for each of the defined regions of the flash memory based on the data in the number-of-writes-per-region-per-use-case table and the periodically tracked occurrences of each of the typical use cases;

calculating, by the external server, an estimated life span for each region of the flash memory based on the calculated average number of periodical page writes by the automotive telematics control unit of the automotive vehicle for each of the defined regions of the flash memory;

estimating, by the external server, a flash-file-system-failure date based on the estimated life span for each region of the flash memory;

whereby storing the collected data in the number-of-writes-per-region-per-use-case table on the external server, calculating the average number of periodical page writes for each of the defined regions of the flash memory by the external server, calculating the estimated life span by the external server, and estimating the flash-file-system-failure date based on the estimated life span for each region of the flash memory by the external server minimize writes to the flash memory associated with estimating the flash-file-system-failure date;

determining whether the flash-file-system-failure date is within a predetermined number of days of a current date; and providing an alert indicating that the flash-file-system-failure date is within a predetermined number of days of a current date.

2. The method of claim 1, wherein the plurality of typical use cases includes a plurality of use cases selected from a group comprising: power on boot, power off shutdown, ignition on (cranking), ignition off, ignition on with the vehicle idling for a predetermined amount of idling time; ignition off with the vehicle parked for predetermined amount of ignition-off time, and the vehicle being driven for a predetermined amount of time, personal calls, emergency calls, roadside assistant calls, radio access technology (RAT) changes.

3. The method of claim 2, wherein providing an alert further comprises transmitting the flash-file-system-failure date to a telematics service center.

4. The method of claim 3, wherein each region of the plurality of regions comprise a plurality of spare blocks that are not shared with any of the other regions of the plurality of regions.

5. The method of claim 4, wherein the tracking the occurrences of each of the typical use cases occurs once per period.

6. The method of claim 5, wherein the average number of periodical page writes is a moving average.

7. The method of claim 6, wherein the predetermined number of days is less than or equal to 120.

8. The method of claim 7, wherein the period is one day.

9. The method of claim 7, wherein the period is one week.

10. The method of claim 1, wherein each region of the plurality of regions comprise a plurality of spare blocks that are not shared with any of the other regions of the plurality of regions.

11. The method of claim 1, wherein the tracking the occurrences of each of the typical use cases occurs once per period.

12. The method of claim 11, wherein the period is one day.

13. The method of claim 11, wherein the period is one week.

14. The method of claim 1, wherein the average number of periodical page writes is a moving average.

15. The method of claim 1, wherein the predetermined number of days is less than or equal to 120.

* * * * *